(12) United States Patent
Abate (10) Patent No.: US 8,988,377 B2
(45) Date of Patent: Mar. 24, 2015

(54) SEARCHING AT A USER DEVICE (71) Applicant: Microsoft Corporation, Redmond, WA (US)

(72) Inventor: Umberto Abate, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 13/674,803

(22) Filed: Nov. 12, 2012

(65) Prior Publication Data

US 2014/0062904 A1 Mar. 6, 2014

(51) Int. Cl.
*G06F 3/0488* (2013.01)

(52) U.S. Cl.
CPC ................................. *G06F 3/04883* (2013.01)
USPC ......................................................... 345/173

(58) Field of Classification Search
CPC combination set(s) only.
See application file for complete search history.

(56) References Cited

U.S. PATENT DOCUMENTS

| | | | | |
|---|---|---|---|---|
| 5,864,635 | A * | 1/1999 | Zetts et al. | 382/187 |
| 2003/0016253 | A1 | 1/2003 | Aoki et al. | |
| 2003/0028851 | A1 * | 2/2003 | Leung et al. | 715/541 |
| 2005/0219226 | A1 * | 10/2005 | Liu et al. | 345/173 |
| 2006/0013487 | A1 * | 1/2006 | Longe et al. | 382/229 |
| 2007/0198948 | A1 * | 8/2007 | Toriyama | 715/790 |
| 2008/0229244 | A1 | 9/2008 | Markus et al. | |
| 2009/0005088 | A1 * | 1/2009 | Hsu | 455/466 |
| 2010/0008031 | A1 | 1/2010 | Reifman et al. | |
| 2010/0169841 | A1 | 7/2010 | Singh | |
| 2010/0198819 | A1 | 8/2010 | Kraenzel et al. | |
| 2010/0214243 | A1 | 8/2010 | Birnbaum et al. | |
| 2010/0262928 | A1 | 10/2010 | Abbott | |
| 2010/0279738 | A1 | 11/2010 | Kim et al. | |
| 2011/0055753 | A1 | 3/2011 | Horodezky et al. | |
| 2011/0223973 | A1 | 9/2011 | Li et al. | |

OTHER PUBLICATIONS

"Gesture Search", Retrieved at <<http://www.google.com/mobile/gesture-search/>>, Retrieved Date: Jun. 22, 2012, pp. 2.
"International Search Report & Written Opinion for PCT Patent Application No. PCT/US2013/056306", Mailed Date: Dec. 12, 2013, Filed Date: Aug. 23, 2013, 11 Pages.
Li, Yang, "Gesture Search: Random Access to Smartphone Content", In IEEE Pervasive Computing, vol. 11, Issue 1, Jan. 2012, pp. 10-13.

* cited by examiner

*Primary Examiner* — Van Chow
(74) *Attorney, Agent, or Firm* — Sonia Cooper; Jim Ross; Micky Minhas (57) ABSTRACT

Method, computer program product and user device for searching implemented at the user device, wherein an input is received from a user via a touch screen of the user device. Without user initiation of a temporary character recognition mode specifically to receive the input, the input is analyzed using character recognition. Responsive to the character recognition recognizing at least one character in said received input, a search mode is invoked in which one or more search results which at least partially match the at least one recognized character are displayed. The user may select one of the displayed search results.

20 Claims, 5 Drawing Sheets

SEARCHING AT A USER DEVICE

RELATED APPLICATION

This application claims priority under 35 USC 119 or 365 to Great Britain Application No. 1215283.1 filed 28 Aug. 2012, the disclosure of which is incorporated in its entirety.

BACKGROUND

A user can interact with a user device, such as a mobile phone, tablet, laptop or PC in different ways. For example, a user may input data to the user device using input means such as a keypad, microphone, camera, motion sensor and/or touch screen, and data may be output to the user using output means such as a display (which may or may not be a touch screen via which the user can input data), speakers and/or vibration means. The use of touch screens in user devices is increasingly popular. The use of a touch screen, rather than a physical keypad to provide a means by which the user can input text to the device allows the screen to cover a greater area of the device, rather than having some of the device dedicated to the physical keypad. This is particularly useful if the user device is a mobile device such as a mobile phone or tablet, where it is particularly beneficial to keep the total size and weight of the device low whilst it is also beneficial to provide a large screen for outputting good quality visual data such as images and videos.

In order to input text via a touch screen, a user indicates that he would like to enter text, e.g. by selecting a text box displayed on the display, and in response a keypad is displayed on a portion of the display. The displayed keypad may for example include a plurality of keys for a respective plurality of letters and/or numbers which the user may wish to input. The user can then type text into the user device by touching the appropriate keys displayed on the touch screen. Often the keys displayed on the touch screen are small, for example if the user device is a mobile phone or tablet and if the displayed keypad includes a key for each of the letters of the English alphabet then each displayed key is small (typically having an area less than 1 cm$^2$ on the screen).

The text that the user inputs to the user device by typing on the keypad displayed on the touch screen may be used for various purposes at the user device. For example, the text input may be used for a search implemented at the user device. For example, the text may be used to search for a contact stored in a contact list at the user device, that the user would like to call. The text that has been input may be used for other searches implemented at the user device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is described herein a method, computer program product and user device for searching implemented at the user device. An input is received from a user via a touch screen of the user device. In one or more embodiments, the input is written by the user on the touch screen, e.g. using a finger or a stylus. The input is analysed using character recognition. The input may be analysed without user initiation of a temporary character recognition mode specifically to receive the input. In this way the user is not required to provide any indication that he is about to input, on the touch screen, some writing which is intended to be recognized by the character recognition. Instead, in one or more embodiments, the user may simply input the writing on the touch screen and the character recognition implemented at the device will recognize that the input is writing including at least one character. Responsive to the character recognition recognizing at least one character in the received input, a search mode may be invoked at the user device. In the search mode, one or more search results are displayed which at least partially match the at least one recognized character. The user may select one of the displayed search results.

As the user writes on the touch screen, feedback may be displayed on the touch screen showing the input which has been received from the user. The displayed feedback may be overlaid on the displayed search results on the touch screen. The feedback displayed on the touch screen may fade gradually over time. Fading of the feedback reduces clutter displayed on the touch screen.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Typing on touch screens requires a relatively high effort compared to other methods of inputting text to a user device. In order to type on a touch screen, a keyboard is displayed on the touch screen which has small targets (keys), which each cover an area of, for example less than 1 cm$^2$, for each of the characters which may be input. Furthermore, unlike with a physical keyboard, when typing on a keyboard displayed on a touch screen there is little haptic feedback in the typing. It can therefore be difficult for the user to input text using a keyboard displayed on a touch screen. The terms "keyboard" and "keypad" are used interchangeably herein. Furthermore, since a touch screen is often used both as an input area for receiving user input, and as a display for displaying data (or "content") to the user, the display of the keyboard on the touch screen may interfere with the display of the content. The keyboard often covers a significant portion (e.g. 50%) of the display area of the touch screen, thereby reducing, e.g. by half or possibly even to zero, the area of the touch screen which is used to display content to the user.

The drawbacks with typing on a touch screen may cause users to avoid the need to type on a touch screen when implementing some functions on the user device. For example, when searching for an item on the user device, such as a contact from the contact list stored at the device, rather than typing some letters of the contact name into a search box, users may prefer to scroll, or otherwise browse, through the whole contact list to find the contact they are searching for.

There is provided herein a method of searching implemented at the user device via writing (as opposed to typing)

on the touch screen. The user uses an input tool, such as a finger or stylus, like a pen and uses the surface of the touch screen of the device like a canvas. Since the user is not typing, the device does not need to display a keyboard on the touch screen, thereby increasing the area of the display that can be used to display content. By using most, or all, of the surface of the touch screen as both an input area and a display area, and by not being required to aim for several precise targets (the keys of a displayed keyboard) users should find the method of inputting text by writing more spontaneous and immediate compared to inputting text by typing on a touch screen. Furthermore, a larger area of the display surface of the touch screen is able to be used for displaying content rather than chrome. "Chrome" is everything other than content which is displayed in the display, for example the frame of an application window. In general, inputting text by writing should provide a better user experience in terms of speed and difficulty than inputting text by typing on a keyboard displayed on a touch screen.

Figure 1:
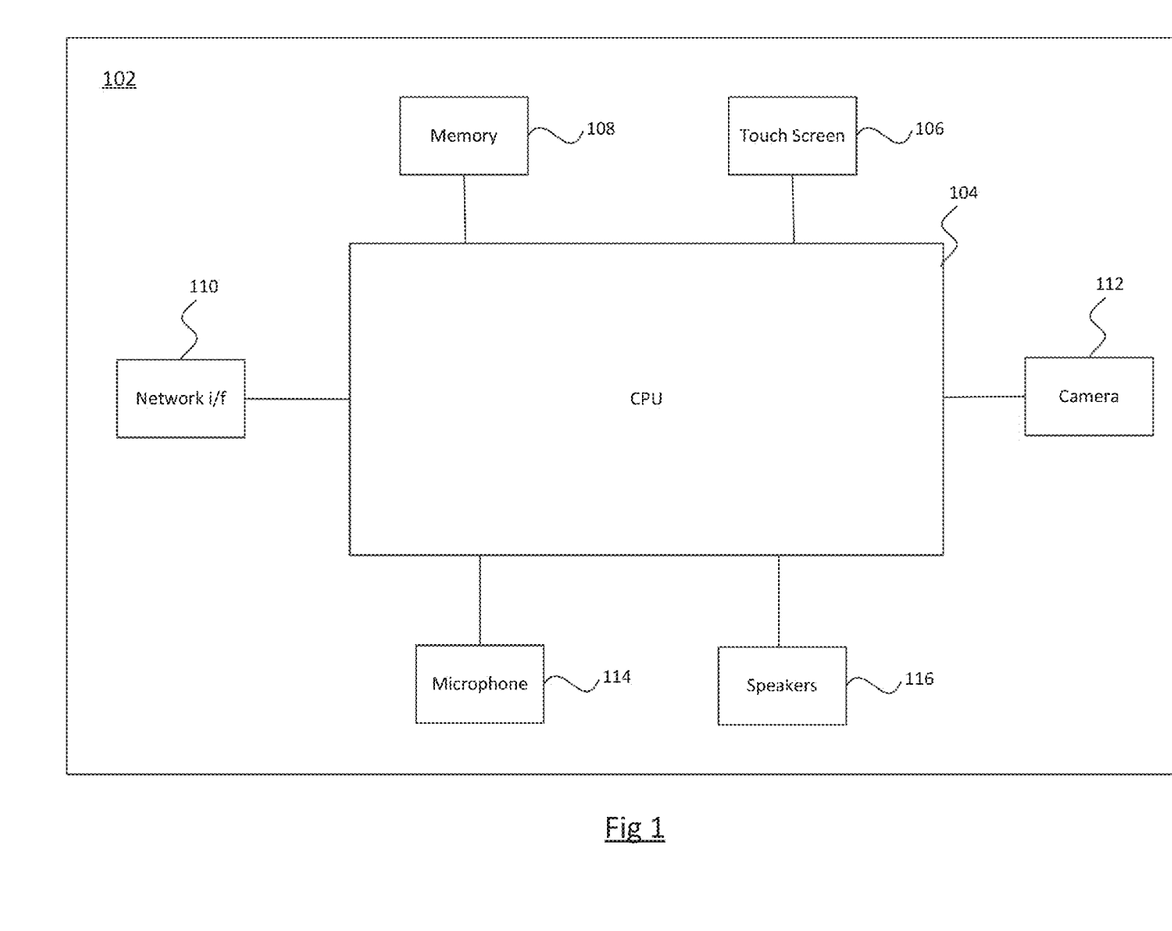
FIG. 1 shows a schematic view of a user device.
Figure 2:
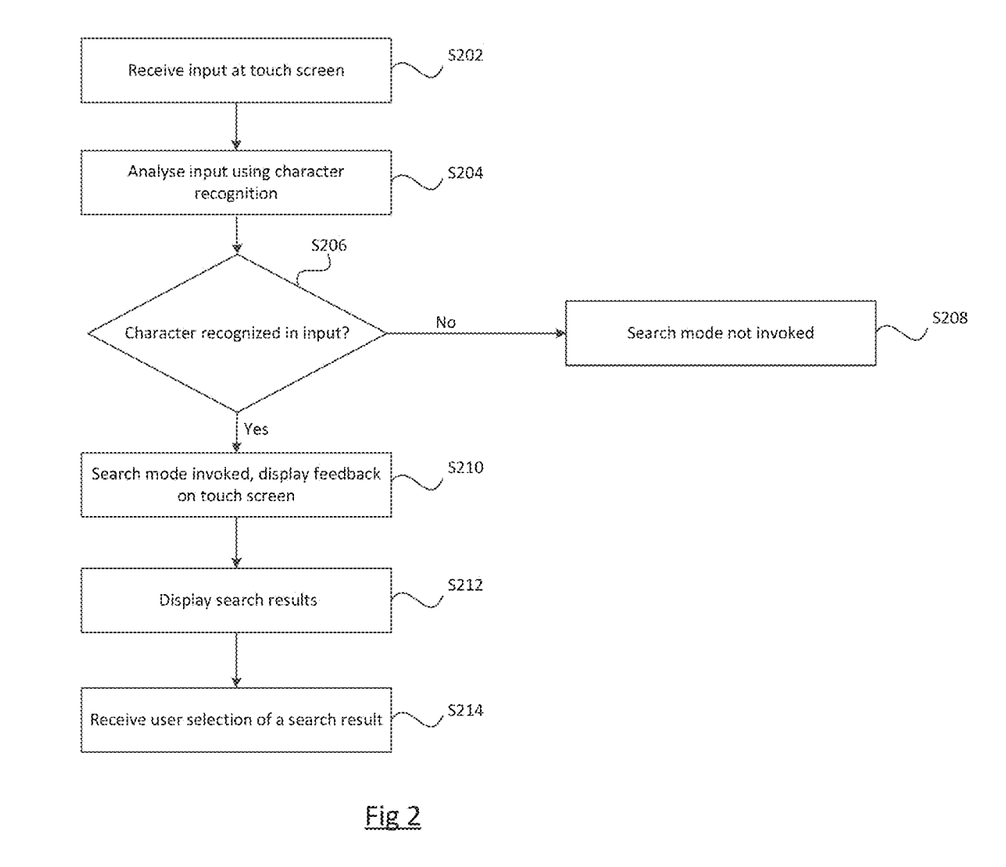
FIG. 2 is a flow chart for a process of searching implemented at a user device.

FIG. 1 illustrates a schematic view of a user device 102. The user device 102 may be, for example, a mobile phone, a tablet, a laptop, a personal computer, a gaming device, a television, a personal digital assistant ("PDA"). The user device 102 is arranged to receive information from and output information to a user of the user device 102. The user device 102 comprises a central processing unit ("CPU") or "processing module" 104, to which is connected a touch screen 106, a memory 108 for storing data, a network interface 110, input devices such as a camera 112 and a microphone 114, and output devices such as speakers 116. The touch screen 106, memory 108, network interface 110, camera 112, microphone 114 and speakers 116 may be integrated into the user device 102 as shown in FIG. 2. In alternative user devices one or more of the touch screen 106, memory 108, network interface 110, camera 112, microphone 114 and speakers 116 may not be integrated into the user device 102 and may be connected to the CPU 104 via respective interfaces. One example of such an interface is a USB interface.

Figure 3:
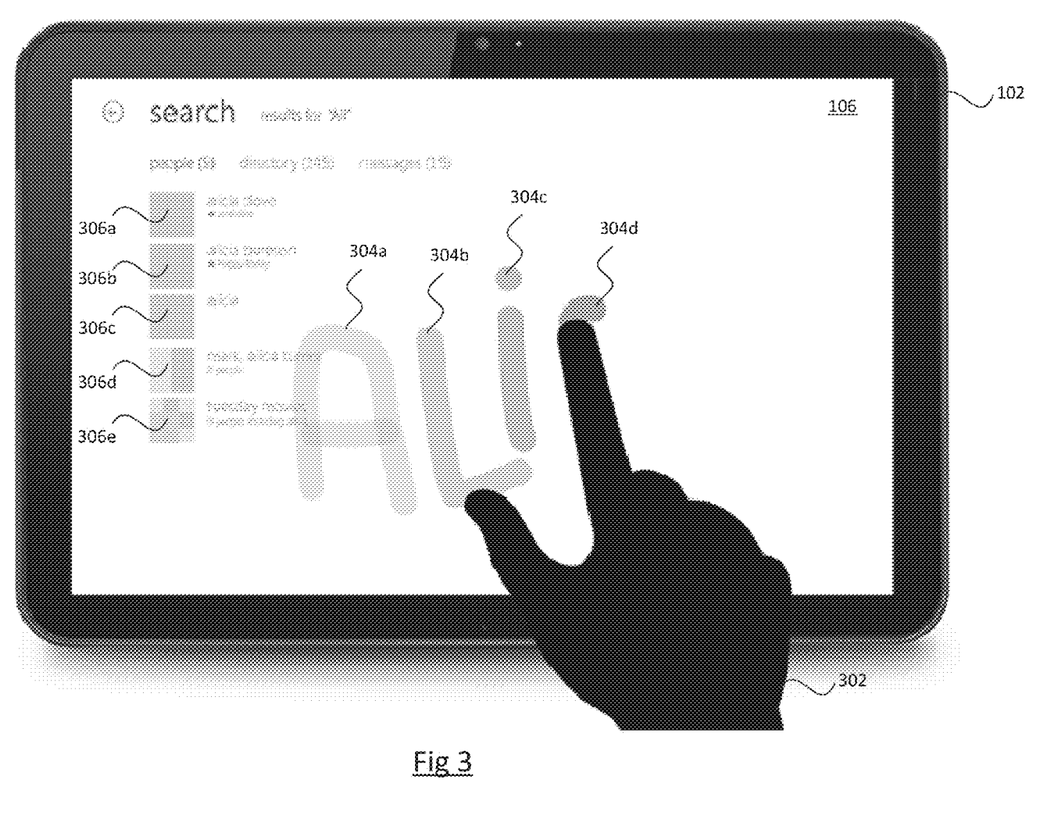
FIG. 3 is a screen shot of a screen of a user device showing how searching may be implemented at the user device.

With reference to FIGS. 2 and 3 there are now described methods of searching implemented at the user device 102.

In step S202 an input is received at the touch screen 106 from the user of the user device 102. For example, the user may input data via the touch screen 106 using his finger or a stylus. The user may enter the data at any time, that is, without having to invoke a search mode and regardless of the application context. For example, an application may be running on the user device 102 when the user provides the input in step S202. Alternatively, the user device may be in an idle state when the user provides the input in step S202.

In step S204 the user device 102 analyses the input using character recognition. The character recognition is implemented by an algorithm in software or hardware implemented at the user device 102. The details of character recognition and the way in which different characters are recognized are known in the art and as such are not described in detail herein.

In step S206 it is determined whether the character recognition has recognized one or more characters in the input received in step S202. The characters may for example be letters, e.g. in the English language alphabet, or numbers, or other characters such as punctuation marks. The character recognition may be adapted to suit the user of the user device 102. For example, if the user is English then the character recognition may be adapted to recognize characters of the English alphabet, whereas if the user is Chinese then the character recognition may be adapted to recognize characters of the Chinese alphabet.

If the character recognition does not recognize any characters in the input received from the user at the touch screen 106 then the method passes from step S206 to step S208. In step S208 a search mode is not invoked. When the search mode is not invoked the user device 102 processes the user input according to the state of the user device 102 when the input was received. For example, if the user device 102 is executing an application when the input is received then the input is processed in accordance with the executing application.

However, if the character recognition does recognize one or more characters in the input received from the user at the touch screen 106 then the method passes from step S206 to step S210.

In step S210 a search mode is invoked and feedback of what the user has written is displayed on the touch screen 106. The feedback allows the user to see what he has written on the touch screen 106, which is useful for the user and provides assurance to the user that the input is being recognized as writing by the character recognition. Since no keyboard is displayed on the touch screen 106, the feedback of the user's writing can be overlaid on top of other content that is being displayed by the touch screen 106.

In step S212 when a character is recognized by the character recognition the screen displayed on the touch screen 106 changes to show a search result page. One or more search results are displayed in the search result page on the touch screen 106. FIG. 3 shows an example of a screen shot of the touch screen 106 displaying the search result page. In the example shown in FIG. 3 the user device 102 is a tablet and the touch screen 106 covers most of the surface area of one side of the device 102. FIG. 3 shows a representation of the user's hand 302 and shows the user inputting writing on the touch screen. FIG. 3 shows the feedback which is displayed on the touch screen 106 as the user writes. A plurality of characters (a letter 'A' 304a, a letter 'L' 304b and a letter 'i' 304c) have been recognized by the character recognition and are shown as feedback on the touch screen 106. FIG. 3 shows the user in the process of inputting another character 304d which has not yet been recognized by the character recognition.

As shown in FIG. 3 the search result page is displaying search results (306a to 306e) which match, or at least partially match, the characters which have been inputted on the touch screen 106 by the user. In the example shown in FIG. 3, the letters "ALi" have been recognized from the user's input. The displayed search results are "alicia dove" 306a, "alicia bureson" 306b, "alicia" 306c, "mark, alicia turner" 306d and "Tuesday movies" 306e which is a conversation group including 9 people including "alicia". All of the displayed search results at least partially match the characters recognized from the user's input.

The search results 306a, 306b and 306c are contacts of the user which are stored in a contact list, e.g. in the memory 108 of the user device 102. The search results 306d and 306e are conversation groups with which the user has entered into communication events (e.g. calls) in the past. These search results are shown under the tab "people" in the search results page. The search results page indicates that there are also 245 search results under a "directory" tab and 15 search results under a "messages" tab. The search results under the directory tab include files, such as music, data or application files, stored in the memory 108 of the device 102 with filenames which match, or partially match, the recognized characters "ALi". The search results under the messages tab include messages which have been sent to and from the user, and which involved a contact whose name matches, or partially matches, the recognized characters "ALi". In general, the search could be any type of search and the search results could be any items stored at, or retrievable by, the user device 102.

The search results displayed on the search result page on the touch screen 106 are updated each time one of the characters is recognized by the character recognition. In this way the search results get filtered as the user continues writing.

The search results are retrieved from at least one group of items which may be searched. The group(s) of items may, for example, include at least one of: contacts, communication events, bookmarks, applications or files which may be stored in the memory 108 of the user device 102. As another example, the group(s) of items may include place names, e.g. country names, or other items of data from limited sets. The groups are finite, and may include a limited number of items, for example, less than 5000. This provides a context for the search. Since there are a limited number of possible search results for the search only a few characters may be needed to be recognized in order to get useful search results. In other words, the recognition of characters in the writing of the user is contextualised such that just a few recognized characters should be enough to return relevant auto complete suggestions for the search results.

The search results displayed in the search result page may be limited by a context of an application executing at the device 102 when the input is received from the user in step S202. For example, if the user device 102 is showing a contact search page (through which the user can search for contacts) when the input is received in step S202 then the search results may be limited to showing contacts of the user (i.e. by not showing other possible search items). The context of the application executing at the device, or the state of the user device 102, when the input is received from the user in step S202 can be used to filter the search results displayed to the user in step S212. The filtering of the search results based on context is optional, and in some embodiments may not be desired.

The order of the displayed search results may simply be the order in which the search results are found. Alternatively, the search results may be organized into an order based on how likely each of the search results is to be the result that the user is searching for. For example, the order of the displayed search results may be determined based on at least one of: (i) how well the search result matches the at least one recognized character, i.e. the strength of the match, and (ii) a context of an application executing at the device when the input is received from the user. The strength of the match may be determined based on whether the match is a full match or a partial match. Furthermore, the strength of the match may be determined based on where in the search result the recognized characters are included, for example whether the recognized characters match the first letters of the search result. For example, the strength of the match for the search result "Alicia" for the recognized characters "ALi" may be greater than the strength of the match for the search result "Stalin" for the recognized characters "ALi", even though both search results include the recognized characters "ALi".

As is shown in FIG. 3, the feedback of what the user has written that is displayed on the touch screen 106 fades gradually over time. For example, it can be seen that the first inputted character 304a has faded the most. The second inputted character 304b has faded slightly less than the first character 304a because the time since the user inputted the second character 304b is less than the time since the user inputted the first character 304a. Similarly, the third inputted character 304c has faded slightly less than the second character 304b because the time since the user inputted the third character 304c is less than the time since the user inputted the second character 304b. The characters fade out and preferably will completely disappear from the display after a few seconds. The exact time taken for the characters to completely disappear from the display is implementation dependent. Advantageously, by fading the characters gradually over time, the user is provided with feedback of what he has written, but also the screen is not cluttered. Since the same portion of the touch screen 106 (e.g. the whole of the display area of the touch screen 106) is used for displaying content and for the user to input writing, the feedback of what the user has written is overlaid on the content (e.g. the search results) being displayed on the touch screen 106. It is useful for the feedback to gradually fade away so that the display area of the touch screen 106 does not become too full of the displayed feedback. This reduces the cluttering of the display of the touch screen 106.

The gradual fading over time of the feedback is preferable to removing the character from the display each time a character is recognized because it allows the user to input multiple characters and to see the characters that he has previously entered, as he has previously entered them (i.e. in the form that he has previously entered them). This makes the inputting of the text very similar to writing with a pen on a canvas, which the user will be familiar with. Therefore, displaying the previously entered characters as the user has entered them (albeit in a fading form) makes the inputting of the text feel more natural to the user than if the feedback for each character was removed or moved to a separate section of the touch screen 106 each time a character was recognized.

In step S214 a user selection of one of the search results is received. In order to select a search result the user may touch the search result displayed on the touch screen 106. In some embodiments, the user may double-touch the search result displayed on the touch screen 106 so that the user device 102 can determine that the user is selecting the search result rather than continuing to write on the touch screen 106. Alternatively, the user may wait for the feedback of his writing to completely fade away and then the user device will recognize his next input as a selection of a search result rather than a continuation of the writing on the touch screen 106. There may be other methods for the user device 106 to differentiate between the user selection in step S214 and a continuation of the writing on the touch screen 106. As another example, the user may touch a predefined portion of the touch screen (e.g. the bottom left corner of the touch screen 106) while selecting a search result and the user device 102 may be configured to determine that when the user touches the predefined portion of the touch screen 106 then he is intending to select a search result rather than continue writing. In this way the user does not need to wait for the feedback of the writing to completely fade away before he can select a search result. The user may signal that his input is intended to select a search result rather than input further writing in other ways, e.g. pressing a button on the user device 102 or shaking the device (which may be sensed by a motion sensor in the device 102) or by speaking a command (which may be sensed by the microphone 114) or by performing some action which could be captured by the camera 112.

In the embodiments described above, the search mode is initiated from character detection in the user's input. The search mode is globally accessible and the user can write on the touch screen 106 to initiate the search mode at any time (e.g. with any screen displayed on the touch screen 106) without having to invoke a search mode and regardless of the application context. In these embodiments the input at the touch screen 106 is analysed using character recognition even without user initiation of a temporary character recognition mode specifically for the purpose of receiving said input. That is, the user is not required to provide an input to the user device 102 to indicate that the following input on the touch screen 106 is intended to include writing which should have character recognition applied to it. This allows the user to initiate the search mode simply by writing on the touch screen 106, wherein recognition of one or more characters in the input received at the touch screen 106 invokes the search mode as described above. This may allow the search mode to be initiated from any screen and/or from any application executing at the user device 102.

Alternatively, the search mode may be accessible following a recognizable gesture to make the touch screen 106 become the canvas for search input. In this case, the user sets the user device 102 in a temporary character recognition mode in which character recognition is applied to writing input via the touch screen 106. In this case, character recognition may not be applied to writing input on the touch screen 106 when the user has not initiated a temporary character recognition mode. The user initiation of the temporary character recognition mode may comprise receiving a predefined input from the user via the touch screen 106 or another input component of the user device 102. The user may initiate the temporary character recognition mode by performing a predefined action, such as touching a predefined area of the touch screen 106, e.g. one of the edges of the touch screen 106, or by pinching and zooming out via the touch screen 106, or by swiping from the bottom to the top of the touch screen 106 or by shaking the user device 102 which could be sensed by a motion sensor of the device 102 to give just some examples.

The temporary character recognition mode may end after a predetermined time (e.g. 30 seconds) or may end when a search result has been selected in step S214. The user may end the temporary character recognition mode by performing another predefined action such as touching a predefined area of the touch screen 106, e.g. one of the edges of the touch screen 106, or by pinching and zooming in via the touch screen 106, or by swiping from the top to the bottom of the touch screen 106 or by shaking the user device 102 which could be sensed by a motion sensor of the device 102 to give just some examples.

In the examples where the user initiates the temporary character recognition mode, the feedback of the user's input may be displayed on the touch screen 106 before the character recognition recognizes a character in the input from the user. That is, in FIG. 2, step S210 may occur before step S206.

As a method of inputting text to the user device 102, writing may not be convenient (compared to typing on a displayed keyboard) when the user needs to write long sentences or paragraphs (e.g. in emails). However, writing may be more convenient than typing for contexts where entering a few characters is enough to complete the task (e.g. search). In one or more embodiments the method is used to search for contacts and/or conversations in order to establish a communication event.

Figure 4:
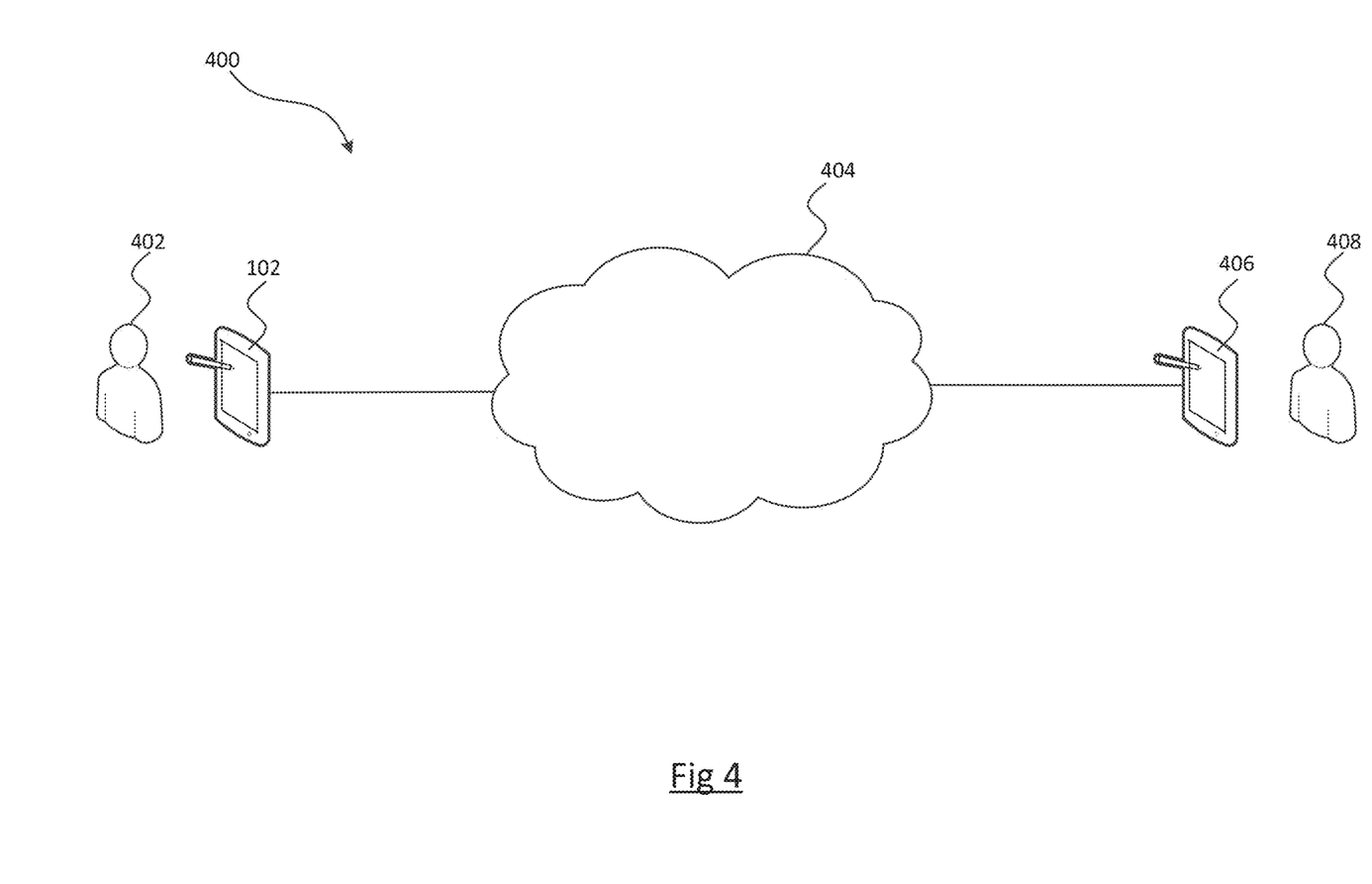
FIG. 4 shows a communication system including two user devices.

For example, a communication system 400, as shown in FIG. 4, may include the user device 102 useable by a user 402 (called Bob), a network 404 and a user device 406 useable by a user 408 (called Alicia). The user device 102 may be connected to the network 404, e.g. using the network interface 110 of the user device 102. Similarly, the user device 406 may be connected to the network 404. In other embodiments the communication system 400 may comprise any number of users and associated user devices. The user devices 102 and 406 can communicate over the network 404 in the communication system 400, thereby allowing the users 402 and 408 to communicate with each other over the network 404. The network 404 may, for example, be the Internet or another type of network such as a telephone network (such as the PSTN or a mobile telephone network). Each of the user devices 102 and 406 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 404. The user device 102 is arranged to receive information from and output information to the user 402 of the user device 102. The user terminal 406 may correspond to the user terminal 102, wherein the user device 406 is arranged to receive information from and output information to the user 408 of the user device 406.

The users 402 and 408 may be contacts of each other in the communication system 400. In the example where the search results displayed on the touch screen 106 are those shown in FIG. 3, the search result 306c is the contact "Alicia", i.e. user 408. If the user selects the search result 306c in step S214 then a communication event, such as an audio or video call or an email or an instant messaging session may be established between the user devices 102 and 406 over the network 404 in the communication system 400, thereby enabling user 402 (Bob) to communicate with user 408 (Alicia).

Figure 5:
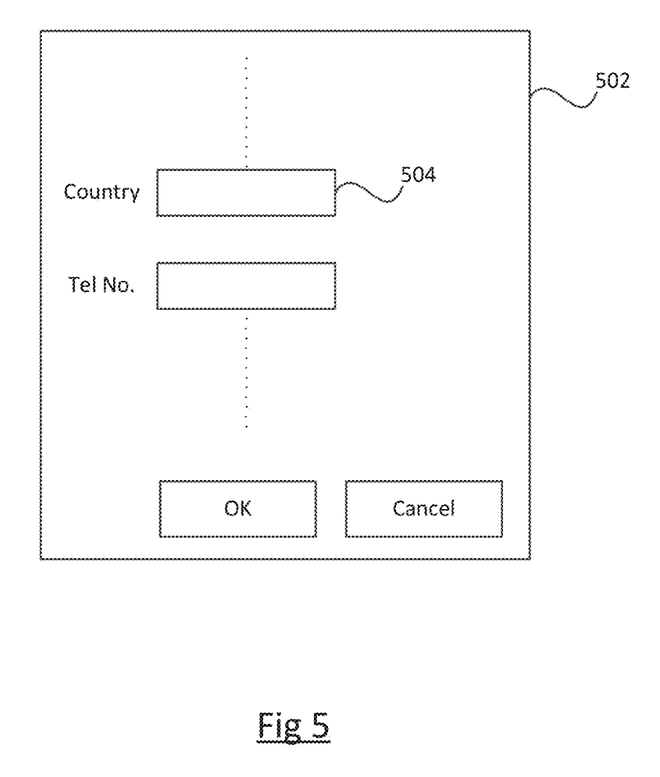
FIG. 5 shows a user interface which may be displayed at a user device.

FIG. 5 shows a user interface 502 which may be displayed at the user device 102. The user interface 502 shows a form which the user is trying to fill in. One of the boxes on the form is a country box 504 into which the user of the user device 102 would like to enter the name of a country. The user could place the cursor in the country box 504 and then invoke a method as described herein to search for a country name for insertion into the box 504. In doing so, the user would write at least some of the letters of the country name on the touch screen 106. According to the methods described herein, search results which at least partially match the characters in the writing that the user has inputted to the touch screen 106 would be displayed to the user. Based on the context of the cursor being in the country box 504 of the form, the search results may be limited to showing country names, or by placing country names at the top of the displayed search results. The user can then select a country name from the search results and the selected country name would be inserted into the country box 504 on the form. For example, if the user wanted to insert the country name "United Kingdom" into the country box 504, he could write some of the letters of the country name on the touch screen, for example the letters "Uni". When these characters have been recognized by the character recognition implemented at the user device 102, the search results would show country names which include these letters. For example, the country names "United Kingdom" and "United States of America" may be displayed in the search results along with other country names which include these letters. The user can then select the "United Kingdom" search result and the country name "United Kingdom" will be entered into the country box 504 on the form. A similar method could be implemented to insert other pieces of data into boxes which the user is trying to fill in. This method may be faster and easier for the user than typing the data on a keyboard displayed on the touch screen. Furthermore, this method does not require a keyboard to be displayed on the touch screen, thereby allowing more of the touch screen to be used to display content. The method is particularly well suited to types of data where one item of a limited group of possible items is to be inserted into a box. For example it is well suited to entering a country name because there is a limited group of possible country names which may be intended. The method is particularly well suited to when there is a limited domain to search within (e.g. in an address book, a country list, a file system, a conversation history, an online directory, etc) or when the domain limits are not known but can be indexed and searched (e.g. on the web).

Therefore, as described herein, by allowing the users to input data by writing—not typing—users do not need to select small targets (keys) on a displayed keyboard in sequence to enter text. Furthermore, with this approach applications do not require a keyboard to be shown on the touch screen, thereby leaving the whole of the touch screen 106 able to display information. The method of inputting text by writing should feel more spontaneous and less difficult to the user, compared to inputting text by typing on a keyboard displayed on the touch screen, because it may not demand the same concentration as selecting the keys of the displayed keyboard. The writing input method is also less disruptive than the typing input method because the canvas of the touch screen 106 does not need to reflow content to accommodate the displayed keyboard.

In general, the methods described herein of searching by inputting data by writing—rather than typing on a touch screen—are more enjoyable (e.g. easier and quicker) for a user. A user is therefore more likely to choose to perform a search due to the ease of searching using the writing methods described herein, rather than finding an alternative way to find an item (e.g. by scrolling down through a list of contacts to find a contact, rather than performing a search operation).

The method steps described herein and in particular the method steps shown in FIG. 2 may be implemented in software or hardware at the user device 102. For example, there may be provided a computer program product configured to implement searching at a user device, the computer program product being embodied on a tangible computer-readable hardware storage medium and configured so as when executed on the processor 104 of the user device 102 to perform the operations of any of the methods described herein. Computer-readable hardware storage media are intended to cover all statutory forms of media and thus exclude non-statutory subject matter such as carrier waves and signals per se.

There may be provided a user device configured to implement any of the methods described herein, for example, by executing a suitable computer program.

For example, there may be provided a device configured to implement a search, wherein the device comprises a touch screen and wherein the device is configured to:
receive an input from a user via the touch screen;
analyse the input using character recognition without user initiation of a temporary character recognition mode specifically to receive said input;
invoke a search mode responsive to the character recognition recognizing at least one character in said received input;
display, in said search mode, one or more search results which at least partially match the at least one recognized character; and
receive a user selection of one of the displayed search results.

As another example, there may be provided a device configured to implement a search, wherein the device comprises a touch screen and wherein the device is configured to:
receive an input from a user via the touch screen;
display feedback on the touch screen showing the input received from the user, wherein the device is configured to fade the feedback displayed on the touch screen gradually over time;
analyse the received input using character recognition;
responsive to the character recognition recognizing at least one character in said received input, display on the touch screen one or more search results which at least partially match the at least one recognized character; and
receive a user selection of one of the displayed search results.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of searching implemented at a user device, the method comprising:
receiving a written input from a user via a touch screen of the user device;
without user initiation of a temporary character recognition mode specifically to receive said written input, analysing the written input using character recognition;
responsive to the character recognition recognizing at least one character in said received written input, invoking a search mode;
in said search mode:
displaying one or more search results which at least partially match the at least one recognized character; and
displaying feedback of the written input received from the user overlaid on the displayed search results, the displayed feedback gradually fading over time; and
receiving a user selection of one of the displayed search results.

2. The method of claim 1 wherein the touch screen is used both as an input area for receiving the written input, and as a display for displaying the one or more search results.

3. The method of claim 1 wherein said at least one character in the received written input comprises a plurality of characters which are recognized by the character recognition.

4. The method of claim 3 wherein the displayed search results are updated each time one of the plurality of characters is recognized by the character recognition.

5. The method of claim 1 wherein the one or more search results are retrieved from at least one group of items which may be searched.

6. The method of claim 5 wherein the at least one group of items includes at least one of: contacts, communication events, bookmarks, applications, files, or place names.

7. The method of claim 5 wherein the groups of items which are searched are limited by a context of an application executing at the device when the written input is received from the user.

8. The method of claim 1 wherein a plurality of search results are displayed and wherein the order of the displayed search results is determined based on at least one of: how well the search result matches the at least one recognized character, or a context of an application executing at the device when the written input is received from the user.

9. The method of claim 1 wherein the selected one of the displayed search results is a contact of the user and wherein the method further comprises initiating a communication event with the contact in response to receiving said user selection of the contact.

10. A method of searching implemented at a user device, the method comprising:

receiving a written input from a user via a touch screen of the user device;

displaying feedback on the touch screen showing the written input received from the user, wherein the feedback displayed on the touch screen fades gradually over time;

analysing the received written input using character recognition;

responsive to the character recognition recognizing at least one character in said received written input, displaying on the touch screen one or more search results which at least partially match the at least one recognized character; and receiving a user selection of one of the displayed search results.

11. The method of claim 10 wherein the displayed feedback is overlaid on the displayed search results on the touch screen.

12. The method of claim 10 wherein said analysing the received written input is performed without user initiation of a temporary character recognition mode specifically to receive said written input.

13. The method of claim 10 further comprising receiving user initiation of a temporary character recognition mode specifically to receive said written input, wherein said analysing the received written input using character recognition is performed only if the temporary character recognition mode has been initiated.

14. The method of claim 13 wherein said user initiation of the temporary character recognition mode comprises receiving a predefined input from the user via the touch screen or another input component of the user device.

15. The method of claim 10 wherein said at least one character in the received written input comprises a plurality of characters which are recognized by the character recognition, and wherein the displayed search results are updated each time one of the plurality of characters is recognized by the character recognition.

16. The method of claim 10 wherein the one or more search results are retrieved from at least one group of items which may be searched.

17. The method of claim 16 wherein the at least one group of items includes at least one of: contacts, communication events, bookmarks, applications, files, or place names.

18. A computer-readable hardware storage medium comprising instructions executable by a processor of a user device to perform operations for searching at the user device, the operations comprising:

receiving a written input from a user via a touch screen of the user device;

without user initiation of a temporary character recognition mode specifically to receive said written input, analysing the written input using character recognition;

responsive to the character recognition recognizing at least one character in said received written input, invoking a search mode;

in said search mode:
　displaying one or more search results which at least partially match the at least one recognized character; and
　displaying feedback of the written input received from the user overlaid on the displayed search results, the displayed feedback gradually fading over time; and receiving a user selection of one of the displayed search results.

19. The method of claim 1, further comprising:

receiving a second written input from the user via a touch screen of the user device;

displaying revised search results which at least partially match characters recognized from the written input and the second written input; and displaying feedback of the written input and the second written input received from the user overlaid on the displayed revised search results, the displayed feedback of the written input and the second written input gradually fading over time.

20. The method of claim 19, wherein the feedback for the written input is more faded than the feedback for the second written input.

* * * * *